United States Patent [19]

Nakagaki et al.

[11] E Re. 30,741

[45] Reissued Sep. 15, 1981

[54] MINIATURIZED PRINTER CONTROL ASSEMBLY

[75] Inventors: Norio Nakagaki; Shigeru Sawada, both of Shiojiri, Japan

[73] Assignee: Shinshu Seiki Kabushiki Kaisha, Tokyo, Japan

[21] Appl. No.: 138,611

[22] Filed: Apr. 9, 1980

Related U.S. Patent Documents

Reissue of:

[64] Patent No.: 4,170,937
Issued: Oct. 16, 1979
Appl. No.: 871,585
Filed: Jan. 23, 1978

[30] Foreign Application Priority Data

Jan. 24, 1977 [JP] Japan ..... 52/6524

[51] Int. Cl.[3] ..... B41J 1/44

[52] U.S. Cl. ..... 101/99; 101/93.22; 101/95

[58] Field of Search ..... 101/93.29–93.36, 101/93.22, 95, 96, 99, 110

[56] References Cited

U.S. PATENT DOCUMENTS

| | | | |
|---|---|---|---|
| 3,141,403 | 7/1964 | Brown et al. | 101/99 |
| 3,420,166 | 1/1969 | Ellis et al. | 101/93.29 |
| 3,599,773 | 8/1971 | Serracchioli et al. | 101/99 X |
| 3,838,638 | 10/1974 | Clary | 101/99 X |
| 3,858,506 | 1/1975 | Foost | 101/99 X |
| 3,872,789 | 3/1975 | Ambrosio | 101/110 X |
| 3,965,815 | 6/1976 | Lupkas et al. | 101/110 X |
| 3,991,672 | 11/1976 | Keith et al. | 101/99 |
| 4,054,089 | 10/1977 | Okabe | 101/110 X |

*Primary Examiner*—Edward M. Coven
*Attorney, Agent, or Firm*—Blum, Kaplan, Friedman, Silberman & Beran

[57] ABSTRACT

A miniaturized printer wherein the duration of each print cycle, the sequence of printing operations performed in each print cycle and the time between each print cycle is controlled by a detecting arrangement. The detecting arrangement is adapted to detect the rotary position of a plurality of print rings having print characters circumferentially disposed therearound and for generating a character selection timing pulse for each of the available rotational positions of each print ring during a print cycle. The rotational position of each print ring corresponds to a print character circumferentially disposed about the print ring and, to this end, a print selection mechanism associated with each of the print rings selectively positions each of the print rings at respective predetermined print positions during each print cycle in response to the character selection timing pulses produced by the detection arrangement so that printing can be performed thereby. The detecting arrangement is further constructed and arranged to produce a stand-by signal representative of each print ring being positioned at a stand-by position at the end of each print cycle. The detecting arrangement further includes a shutter mechanism for preventing the detecting arrangement from producing a stand-by signal until a predetermined interval of time after the last of the character selection timing pulses are generated during each print cycle.

12 Claims, 14 Drawing Figures

FIG. 4a
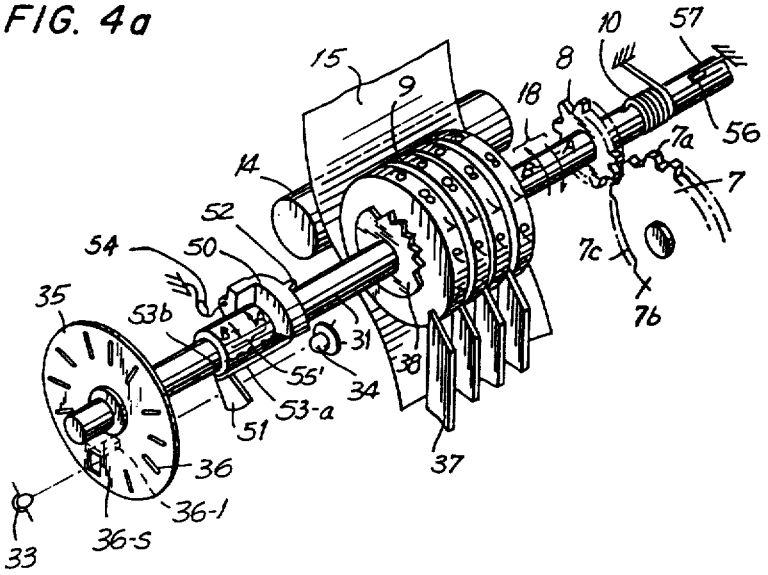
FIG. 4b
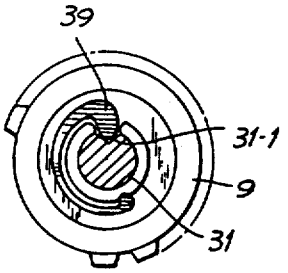
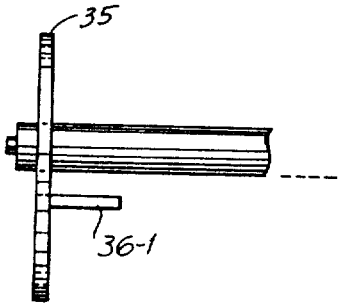
FIG. 4c

MINIATURIZED PRINTER CONTROL ASSEMBLY

Matter enclosed in heavy brackets [ ] appears in the original patent but forms no part of this reissue specification; matter printed in italics indicates the additions made by reissue.

BACKGROUND OF THE INVENTION

This invention is directed to a miniaturized printer of the type having a plurality of print rings with print characters circumferentially disposed therearound, and in particular to an improved detecting and control arrangement for use with a miniaturized printer of the type utilized in a desk calculator, for controlling the length of each print cycle, the sequence of printing operations performed during each print cycle, and the duration of time between print cycles.

Miniaturized printers, of the type utilized to provide a permanent record in a desk calculator or other computing instrument, such as a cash register or the like, are characterized by the use of a drive motor that is energized during printing, and is deenergized when the printer is not in use. When the printer is in use, a supply voltage is supplied to the drive motor to effect an energization of same for a complete printing cycle of the printer, which printing cycle includes the positioning of the print rings for printing, the printing operation, and the return of the print rings to a stand-by position wherein each of the print rings are aligned in a rest position so that the next printing cycle can be commenced.

Due to the rapid speed with which information can be processed by small-sized electronic instruments, such as desk calculators and the like, it is preferred that the entire printing cycle of the printer be completed at higher speeds with greater accuracy and reliability. Although detector arrangements have been provided for producing signals representative of the operations being performed during a print cycle, a second detection arrangement, comprised of a lead switch having mechanical contacts, has provided printing control that is less than completely satisfactory. Specifically, the use of a mechanical detector results in the duration of the print cycle being increased and, hence, the speed of the printer being likewise decreased. Accordingly, a detection arrangement for a miniaturized printer that permits a read switch and mechanical contacts associated therewith to be eliminated from the printer assembly, is desired.

SUMMARY OF THE INVENTION

Generally speaking, in accordance with the instant invention, a miniaturized printer having an improved detecting arrangement for controlling the duration of a print cycle, the sequence of printing operations performed during the print cycle and the duration of time between print cycles, is provided. The printer includes a plurality of print rings having print characters circumferentially disposed therearound. The print characters are selectively positioned in a print position by rotation of each of the print rings in a first rotational direction from a stand-by position to a print position during a print cycle. A motor is provided for rotatably driving the print rings at least from a stand-by position to a print position during each print cycle in response to the motor being energized. A detection arrangement is provided for detecting the rotary position of the print rings and for generating a character selection timing pulse for each of the available rotational positions of each of the print rings during each print cycle. The rotational positions of each of the print rings correspond to a print character circumferentially disposed about the print ring. A print selection mechanism is associated with each of the print rings for selectively positioning each of the print rings at respective predetermined print positions during each print cycle in response to the character selection timing pulses produced by the detection means being applied thereto. The detection arrangement is constructed and arranged to produce a stand-by signal representative of each of the print rings being positioned in a stand-by position at the end of each print cycle. The detection arrangement is also provided with a shutter mechanism for preventing the detection arrangement from producing the stand-by signal until a predetermined interval of time after the last character selection pulse is generated in each print cycle.

Accordingly, it is an object of the instant invention to provide a faster, more accurate and less expensive printer for use in a miniaturized electronic calculator instrument, such as a desk calculator.

A further object of the instant invention is to provide an improved detection arrangement for a miniaturized printer that controls the duration of a print cycle, the sequence of printing operations effected during each print cycle, and the duration of time between each print cycle.

Still a further object of the instant invention is to provide a detection arrangement for a printer that eliminates the delays between the completion of a print cycle and the commencement of the next print cycle.

Still another object of the instant invention is to provide an improved detection arrangement for a miniaturized printer that eliminates the stand-by time between consecutive printing cycles to thereby improve the accuracy, reliability and printing speed of the printer.

Still a further object of the instant invention is to control the sequence of operation of a miniaturized printer utilizing a single detection arrangement.

Still other objects and advantages of the invention will in part be obvious and will in part be apparent from the specification.

The invention accordingly comprises the features of construction, combination of elements, and arrangements of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 4a is a perspective view of a miniaturized printer including a detection assembly constructed in accordance with the preferred embodiment of the instant invention;

FIG. 4b is an elevational view of a print ring assembly of the miniaturized printer depicted in FIG. 4a;

FIG. 4c is an elevational view of the detection plate depicted in FIG. 4a;

FIG. 6a and FIG. 6b illustrate control circuits for use with the miniaturized printer depicted in FIG. 4a;

FIG. 7b is an elevational view of a print ring assembly of the miniaturized printer depicted in FIG. 7a.

DETAILED DESCRIPTION OF THE PREFERRED EMBODIMENTS

Figure 1:
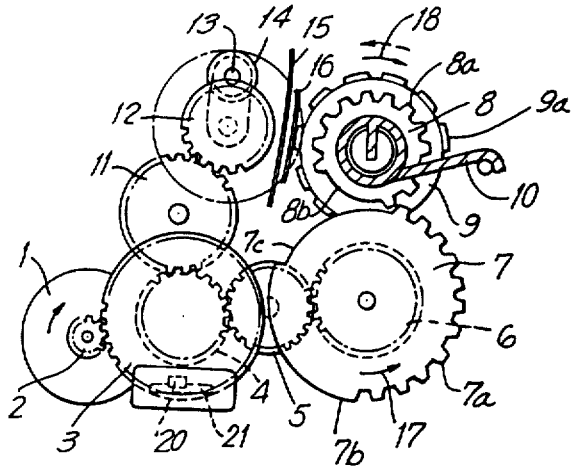
FIG. 1 PRIOR ART
FIG. 1 is an elevational view of a drive mechanism of a miniaturized printer constructed in accordance with the prior art.

Reference is now made to FIG. 1, wherein a conventional motor driven miniaturized printer, having two distinct detection arrangements, is depicted. A drive motor 1 that is adapted to be rotated in a clockwise direction, as viewed in FIG. 1, when energized, and stopped when the drive motor is deenergized, includes a driving gear 2. The driving gear 2 is disposed in meshing engagement with a reduction gear 3. Reduction gear 3 is, in turn, adapted to rotate a single revolution for each printing cycle and is coupled through power transmission gears 4, 5 and 6 and power transmission gear 11 to intermittent driving gear 7 and printing gear 12.

Intermittent driving gear 7 includes a plurality of gear teeth 7a, a non-toothed portion 7b and a notched recess portion 7c peripherally disposed therearound. The gear teeth 7a and remaining portions of the intermittent driving gear 7 are adapted to engage intermittent driven gear 8, which gear also has a portion 8a that is free of gear teeth. Gear 8 is mounted on a shaft that supports a plurality of print rings 9. Print rings 9 include a plurality of print characters 9a, such as letters, numerals, symbols, and the like, that are circumferentially disposed thereabout. A coil spring 10 is provided and includes a first end secured to intermittent gear 8, with the other end of the coil spring 10 being fixedly secured to the frame (not shown) of the printer.

As noted above, printing gear 12 is driven by power transmission gear 11 and has the same ratio of rotation as the intermittent driving gear 7, in order to effect synchronization therebetween. A crankshaft 13 is secured to the printing gear and supports a print roller 14 that is adapted to be rotated into a web of paper 15 and thereby sandwich the web of paper 15 and an ink ribbon 16 between the print roller and print characters formed on the print wheel to effect printing in the usual manner.

Figure 2:
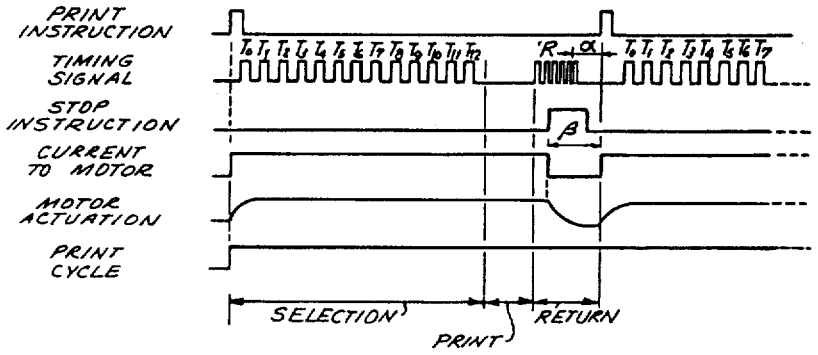
FIG. 2 PRIOR ART
FIG. 2 is a wave diagram illustrating the operation of the miniaturized printer depicted in FIG. 1.

By way of explanation of the operation of the miniaturized printer depicted in FIG. 1, the printer is illustrated in its stand-by position. Referring specifically to FIG. 2, when a PRINT INSTRUCTION signal is applied to the printer, the drive motor 1 is energized to thereby affect a rotation of the intermittent driving gear 7 in the direction (counterclockwise) of the arrow 17. The gear teeth 7a on the intermittent driving gear 7 are immediately brought into meshing engagement with the teeth 8a disposed on the intermittent driven gear 8 to thereby affect a rotation of the intermittent driven gear 8 in the direction (clockwise) of the arrow 18. Rotation of the intermittent driven gear 8, in the direction indicated by the arrow 18, will effect a winding of the portion of the coil 10 around the shaft supporting the print rings. As the intermittent driven gear 8 is rotatably driven by the intermittent driving gear 7, the print rings 9 will also be rotated. In response to the rotation of the print rings, a detection arrangement described in greater detail below will generate character selection timing signals $T_0$ through $T_{12}$. The character selection timing signals are applied to an appropriate character selection mechanism, including a plurality of selection pawls associated with each print ring to selectively position the respective print rings at print positions to effect printing in a well known manner.

As the intermittent driving gear 7 continues to be rotated, and hence continues to rotate each of the print rings, each of the print rings are positioned in a print position whereby a character, or the absence of the character, is selected until an entire line of print is selected. Once each of the print characters are positioned, the portion of the intermittent driving gear 7b, not having any notches formed therein, is disposed in engagement with the last tooth on the intermittent driving gear 8 and, hence, maintains the shaft upon which same is disposed from being unwound by the coil 10 wrapped therearound.

As aforenoted, the rotation of the print roller 14 is synchronized with the rotation of the intermittent gear 7. Accordingly, once each of the print rings 9 are selectively positioned in a print position, and further rotation of the intermittent driven gear 8 is prevented by the portion 7b of the intermittent driven gear 7, the print roller 14 will sandwich the paper web 16 and ink ribbon 16 between same and the print characters to thereby effect a printing of the line of characters on the paper web. Once printing is completed, the increased diameter portion 7b of the intermittent driven gear 7 clears the teeth 8a on the intermittent driven gear 8, leaving the recessed notch 8b in the path of the teeth of the intermittent driven gear 8 and, hence, provides a clearance between the intermittent driven gear 8 and the intermittent driving gear 7. The clearance between gears 7 and 8 permits the intermittent driven gear 8 to be rotated in a counter-clockwise direction (as viewed in FIG. 1), and the uncoiling of the spring 10 to thereby return each of the print rings to a stand-by position. The return of the intermittent driven gear 8 to a stand-by position will result in each of the print rings being aligned in a rest position until the next print cycle is commenced. As detailed below, the timing signal utilized to control the operation of the printer is produced independently of the selection of the print characters, thereby causing a return signal R, that has an unstable frequency, to be produced and detected.

The paper web 15 is advanced, after printing thereon has been completed. Accordingly, the mechanical load of the printer and the inertia of the motor must be taken into consideration in controlling the paper feeding mechanism. To this end, a mechanical detection arrangement, including a magnet 20 disposed on a reduction gear 3 and a lead switch 21 secured to the printer frame (not shown), provide a STOP INSTRUCTION signal to the printer just prior to, or immediately after, the paper feeding is completed. The STOP INSTRUCTION signal is utilized to interrupt the current applied to the drive motor 1 and electrically break same. By interrupting the current applied to the drive motor and electrically braking same, the intermittent driving gear 7 is no longer rotated and is maintained at a stand-by position. When the drive motor 1 is deenergized, and hence stops rotating, the paper feeding operation is completed. Also, the intermittent driven gear 8 and print rings 9 are returned to the stand-by position to prepare the printer to receive the next PRINT INSTRUCTION signal and complete the print cycle.

Figure 3A:
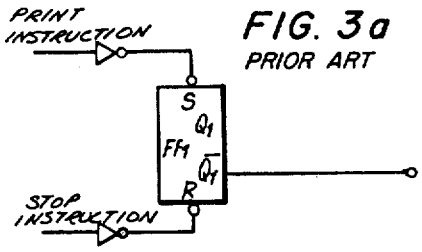
FIG. 3a PRIOR ART
FIGS. 3a through 3d respectively illustrate control circuitry for controlling the operation of the miniaturized printer depicted in FIG. 1 during each print cycle thereof.

The STOP INSTRUCTION signal, produced by the magnetic detector arrangement, illustrated in FIG. 1, is utilized with control circuits, illustrated in FIGS. 3a through 3d, to effect control of the printing operation during each print cycle. As is illustrated in FIG. 3a, a PRINT INSTRUCTION signal is applied to set terminal S of a flip-flop $FF_1$ and thereby permits a LOW level output $\overline{Q}_1$ to be appplied to the motor control drive circuit and thereby energize the drive motor. However, when a STOP INSTRUCTION signal is applied to the reset terminal R of the flip-flop $FF_1$, the flip-flop is reset so that a HIGH level signal $\overline{Q}_1$ is applied to the drive control circuitry to thereby deenergize the drive motor and brake same.

Figure 3B:
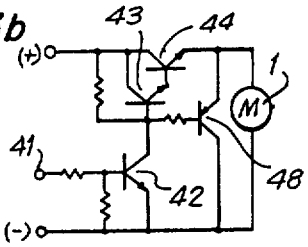
FIG. 3b PRIOR ART

Turning to FIG. 3b, the drive motor control circuit, including a Darlington connection comprised of transistors 43 and 44, are depicted. The transistors 43 and 44 are coupled in series with the parallel connection of drive motor 1 and shunt transistor 48 in order to control the amount of current applied to the drive motor 1 when same is energized and to shunt current across the shunt transistor 48, when it is desired to deenergize the drive motor. The output $\overline{Q}_1$, of flip-flop $FF_1$, is applied to a control terminal 41 of the control circuit, to thereby control the conduction characteristic of transistor 42. When an energizing signal is applied to the control terminal 41 of the transistor 42, the shunt transistor 48 is turned OFF, thereby permitting the Darlington connection to control the speed of the drive motor 1. Alternatively, when a deenergizing signal is applied to the control terminal 41, of the control transistor 42, a shunt transistor 48 is turned ON, thereby shunting all of the current applied to the drive transistor and, at the same time, turning OFF the transistor comprising the Darlington connection, to thereby effect a breaking of the drive motor 1. Accordingly, the STOP INSTRUCTION signal, produced by the magnetic detection switch disposed on the reduction gear 3, is utilized to deenergize and brake the DC motor 1.

Figure 3C:
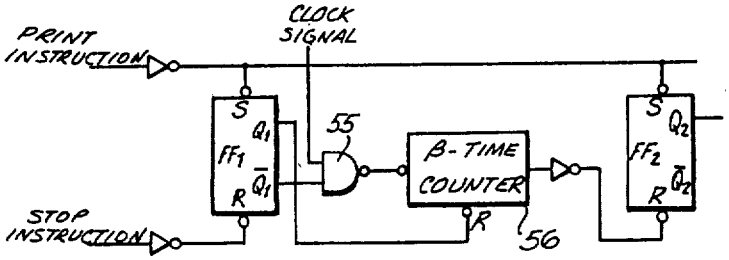
FIG. 3c PRIOR ART

Reference is now made to FIG. 3c, wherein the control circuit for detecting the end of a print cycle is depicted. As is illustrated in FIG. 2, the print cycle is terminated at an interval of time $\alpha$ a after the trailing edge of the signal R, generated by the print rings 9, or after a predetermined interval of time $\beta$, determined by the leading edge of the STOP INSTRUCTION signal, by utilizing a $\beta$-time counter 56 to measure a $\beta$-time interval after the generation of the STOP INSTRUCTION signal. By applying the STOP INSTRUCTION signal to the reset terminal R of the flip-flop $FF_1$, the flip-flop is reset, thereby producing a HIGH level signal at the output $\overline{Q}_1$, which output is applied as a gating signal to NAND gate 55. When a HIGH level gating signal is applied to the NAND gate 55, the clock signal applied to the other input of the NAND gate 55 is transmitted thereby to the $\beta$-time counter 56 to thereby index the $\beta$-time counter 56 through a counting cycle. At the end of the counting cycle, the $\beta$-time counter 56 will apply a reset pulse to the flip-flop $FF_2$ to thereby produce an end of cycle control signal.

Figure 3D:
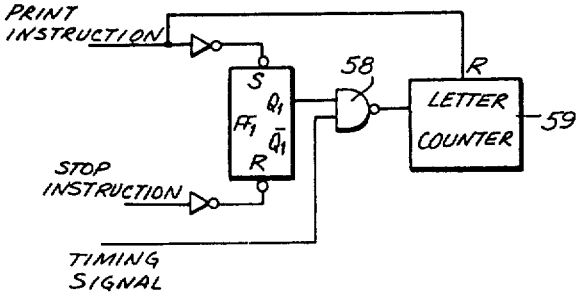
FIG. 3d PRIOR ART

In FIG. 3d, a circuit for synchronizing the selection of print characters with the character selection signals is depicted. The flip-flop $FF_1$ is utilized to control NAND gate 58 and thereby affect gating of the timing signal until the STOP INSTRUCTION signal resets the flip-flop $FF_1$. It is noted that the control circuit, depicted in FIG. 3d, permits the printer to be stopped when the printer is in other than a stand-by condition, if the current is interrupted during the operation of the printer, by assuring proper synchronization between the print characters on the print rings and the character selection signal $T_0$ through $T_{12}$.

It is noted that the use of a STOP INSTRUCTION signal, of the type produced by the magnetic detector arrangement and control circuitry therefor, depicted in FIGS. 3a through 3d, is disadvantageous for several reasons. In addition to not being compatible with the physical design and layout of a printer, there is a considerable reduction in reliability due, in part, to the mechanical contact of the lead switch and the greater number of elements including the lead switch, permanent magnets, etc. The greater number of elements also raise the cost of assembly, repair and installation of the printer. Moreover, the use of a mechanical detector results in the duration of the print cycle being increased, and hence a decrease in the speed with which the printer can be operated. For example, when an astable multivibrator is utilized to produce a clock signal, the thermal characteristics thereof must be accounted for and, accordingly, the $\beta$-time interval must take into account all possible thermal deviations. Thus, the $\beta$-time interval must be maximized to avoid any deviation that may occur in the clock signal.

Accordingly, reference is now made to FIG. 4, wherein a miniaturized printer detection and control arrangement, constructed in accordance with a preferred embodiment of the instant invention, is depicted, like reference numerals being utilized to denote like elements described above. As in the conventional embodiment discussed above, the intermittent driving gear 7 engages the intermittent driven gear 8 and affects rotation of the shaft 31 in the direction A indicated by the arrow 18. The rotation of the shaft 31, in the direction A of the arrow 18, results in a likewise rotation of the print rings 9 and a detection plate 35 affixed to one end of the rotary shaft 31.

The detection plate 35 is part of the detection assembly, generally indicated as 32. The detection plate includes a plurality of slit openings 36 for permitting synchronization of the position of the print characters on each print ring so that the position of each of the print characters on the print ring will be detected by a photo diode 33, such as a luminescent diode, and a suitable photo detector 34, such as a photo transistor, or the like. In response to the character selection timing signal, produced by the slit openings 36, a print select mechanism of the type well known in the art (not shown) will receive the character selection signals $T_0$ through $T_{12}$ and trigger electromagnets associated with each print ring to thereby selectively position selection pawls 37 into engagement with the ratchet teeth on the ratchet gear 38, associated with each print ring, to thereby position the print ring at a print position.

As is explained in greater detail below with respect to the operation of the instant invention, the detection assembly 32 also includes a shutter unit 50 rotatably secured to shaft 31 in order to permit same to be rotated with respect thereto. Also, the detection assembly 32 includes a wide slit opening 36-S formed in the detection plate 35, the wide slit opening 36-S being unrelated to the position of the print character disposed on the print ring and, instead, being representative of a stand-by position of the print rings. Specifically, once each of the print rings is selectively positioned at a print position, the intermittent driven gear is locked with the coil spring 10 in a wound position. The last slit 36-S is considerably wider than the remaining slits 36 in the detection plate to provide a pulse S having a much larger pulse width than the character selection timing signal produced when the print rings are being selectively positioned at different print positions.

Accordingly, once each of the print rings has been selectively positioned in a print position, the rotation of the print rollers, is synchronized with the rotation of the intermittent driving gear 7 in order to effect an engagement of the web and ribbon against the print characters by the print roller 14. When the printing operation is completed, the intermittent driven gear 8 and intermittent driving gear 7 will be in a clearance position with respect to each other, to thereby permit the intermittent driven gear 8 to effect a return of the shaft 31 in the rotational direction B indicated by the arrows 18, and hence a return of the print rings 9 and detection plate 35 to their rest or stand-by position. Upon completion of the printing operation, and during the return of the print rings to a rest position, the paper web is advanced. With particular reference to FIG. 4b, when shaft 31 is rotated by the rotation of the intermittent driven gear 8, the rotation of the print rings is assured by the use of a flat resilient spring 39, disposed in a notch formed in the shaft 31.

As noted above, the detection plate 35 is synchronized with the operation of the print rings 9 and includes slit openings 36 corresponding to the position of each of the print characters disposed therearound with the wider slit 36-S being positioned to define a stand-by position. The detection plate includes an elongated projection 36-1 (best illustrated in FIG. 4c) for engaging a shutter element 51 secured to a projection 53a of the shutter unit 50 to effect a rotation of the shutter unit, in the direction A, illustrated by the arrow 55' in FIG. 4a. Additionally, a bistable spring 54 is coupled to the shutter unit 50 and applies an additional rotary force thereto when the shutter element 51 is rotated in the direction A by the projection 36-1 formed on the detection plate 35. The shutter unit 50 further includes a stopper 52 for positioning the shutter unit when same is rotated by the bistable spring 54 and projection 36-1 of the detection plate. Specifically, an abutment (not shown) is formed on the frame of the printer in order to engage the stopper 52 when the shutter unit 50 is rotated in the direction A and thereby defines a predetermined position wherein the shutter element 51 is disposed in optical alignment between the photo diode 33 and photo detector 34 in order to assure that no light is communicated therebetween.

Accordingly, once the notched portion 7c of the intermittent driving gear 7 clears the toothed portion of the driven gear 8, the driven gear 8 is released, and the shaft 32 is rotated in the direction B, illustrated by arrows 18, to thereby return the print rings to a stand-by position. At the same time, the projection 36-1 is then brought into contact with a second shutter element (not shown) extending from portion 53-b of the shutter unit, whereafter the shutter unit is rotated in the direction B, illustrated by the arrows 55'. An additional rotational force, in the direction B, is provided by the bistable spring 54, thereby rendering it necessary to provide a further abutment (not shown) on the frame of the printer for engaging the projection 52 to prevent same from rotating past the position of the abutment. Moreover, the projecting portion 53-b, supporting the second shutter element 51, is positioned so that the shutter element 51 is not rotated out of optical alignment with the photo detector and photo diode until the stand-by slit 36-S is substantially positioned in the stand-by position in order to assure that no pulses are produced by the detection arrangement until the detection plate 35 is returned to its sand-by position. Accordingly, if the paper feeding mechanism effects an advancement of the paper during the interval that the print rings are returned to a rest position, the printer is ready for the next print cycle when the slit opening 36-S is returned to the stand-by position.

Finally, it is noted that when the springs 39, utilized to postion each of the character rings 9, effect a return of same to a stand-by position, as the projection 56 on the shaft is brought into engagement with a stopper 57, secured to the frame of the printer, the print rings will bounce. Accordingly, the slit 36-S, formed in the detection plate 35, must be sufficiently wide to prevent a character selection timing signal $T_0$ from inadvertently being detected as a result of the bouncing phenomenon experienced by the return of the print rings to a stand-by position. By the arrangement described in detail above, the permanent magnet and lead switch detection arrangement can be eliminated and the timing signals and stand-by signal, utilized in lieu of a STOP INSTRUCTION signal. As illustrated in the wave diagram, depicted in FIG. 5, and the control circuit, depicted in FIG. 6, the character selection timing signals are comprised of pulses $T_0$ through $T_{12}$, which signals are produced by the slit openings 36 in the detection plate 35, and represent the positions of the print characters disposed on the print rings. Additionally, a reference signal S, representative of a stand-by position, is produced by slit 36-S, and is generated during the return portion of the print cycle, after printing has been completed.

Figure 6A:
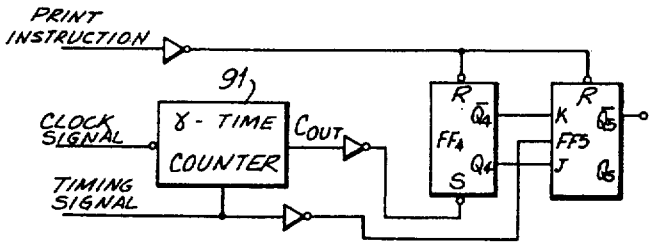

The detection and control arrangement, illustrated in FIG. 6a, eliminates the return signals R, generated by the photo detection arrangement, illustrated in FIG. 1, when the character rings are returned from a print position to a rest position by the shutter unit 50. Specifically, the control circuit, illustrated in FIG. 6a, detects the end of each printing cycle and controls the deenergization of the DC drive motor. The slit 36-S is disposed on the detecting plate 35 at a distance from the slit that produces the pulse $T_{12}$. Accordingly, a $\gamma$-time counter 91, having a time interval larger than the time interval $\alpha$, the time interval between each of the respective character selection pulses $T_0$, $T_1$, $T_2$, etc. is provided. The $\gamma$-time counter 91 receives a clock signal, produced by an astable multi-vibrator and, in the absence of any character selection timing signals being applied to the reset terminal thereof, produces a $\gamma$-time interval signal $C_{out}$ at a $\gamma$time interval after the last character selection timing signal $T_{12}$ is produced. The signal $C_{out}$ is applied to the set terminal S of a flip-flop $FF_4$ and thereby sets the output $Q_4$ of flip-flop $FF_4$ to a HIGH level. When the output of the flip-flop $FF_4$ is referenced to a HIGH level, the respective inputs of the JK flip-flop $FF_5$, which inputs are respectively coupled to the output terminal $Q_4$ and $\overline{Q}_4$ of flip-flop $FF_4$ are referenced to a HIGH and LOW level, respectively. Accordingly, upon the application of a leading edge of the next character selection signal S, which is the stand-by reference signal produced by the wider slit opening 36-S formed in the detection plate 36, flip-flop $FF_5$ applies a deenergization signal to the DC motor 1 to deenergize same in the same manner detailed above.

Figure 5:
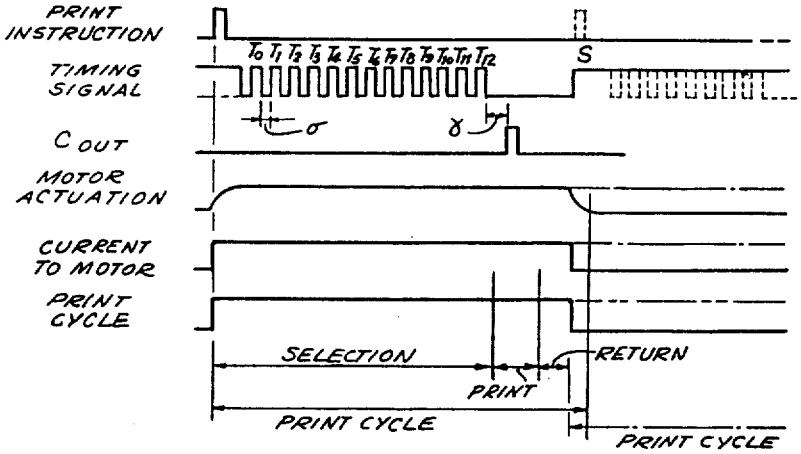
FIG. 5 is a wave diagram illustrating the operation of the control circuits depicted in FIGS. 6a and 6b.

Moreover, if the next PRINT INSTRUCTION signal is applied after the leading edge of the stand-by reference signal S is detected, the PRINT INSTRUCTION signal will reset the JK flip-flop $FF_5$ and, hence, immediately energize the DC motor to begin the next print cycle. This condition is illustrated in FIG. 5, by the dotted lines illustrating the production of timing signals in the event that a PRINT INSTRUCTION signal is applied to the control circuitry once the printing cycle is completed. Alternatively, the stand-by reference signal S will maintain the printer in a deenergized condition until the next PRINT INSTRUCTION signal is applied thereto.

Figure 6B:
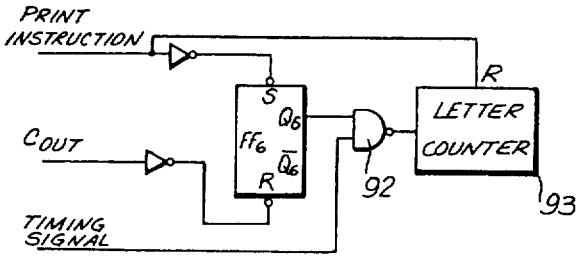

Reference is also made to FIG. 6b, wherein a control circuit for synchronizing the print characters circumferentially disposed on the character rings with the character selection timing signals, produced by the detection plate 35, is illustrated. Specifically, the signal $C_{out}$, produced by the $\gamma$-time counter 91, is applied to the reset terminal of flip-flop $FF_6$ to thereby reset same and apply an inhibit signal to the NAND gate 92. Thereafter, character selection timing signals will not be applied to the letter counter 93 until the next PRINT INSTRUCTION signal is applied to the reset terminal R of the letter counter 93, to thereby reset same. Additionally, the PRINT INSTRUCTION signal is applied to the set terminal S of the flip-flop $FF_6$, to thereby apply a gating signal to the NAND gate 92 and permit the character selection timing signals, representative of the character position of the print rings, to be applied to the letter counter 93. Accordingly, the $\gamma$-time counter 91 is utilized to measure a $\gamma$-time interval after which the character selection signals are prevented from being applied to the letter counter 93 until the next PRINT INSTRUCTION signal is applied thereto. If for any reason, the printer should be stopped at an arbitrary position, the circuitry depicted in FIG. 6b insures that the print characters will be synchronized with the character selection signals produced thereby, and the control circuitry, depicted in FIG. 6a, insures that the motor will not be energized until the stand-by signal S is applied thereto. Accordingly, by utilizing the shutter element to prevent any character selection timing signals from being produced during the interval between the last print character selection timing signal and the occurrence of the stand-by signal S at the end of the printing cycle, a more reliable detection arrangement is provided by a single detection assembly secured to the shaft, thereby permitting the second detection arrangement to be eliminated.

Figure 7A:
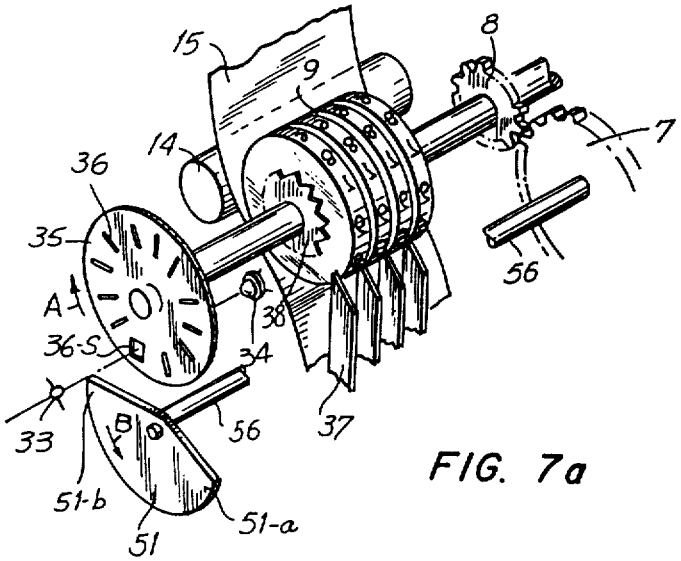
FIG. 7a is a perspective view of a miniaturized printer having a detection arrangement constructed in accordance with a further embodiment of the instant invention.
Figure 7B:
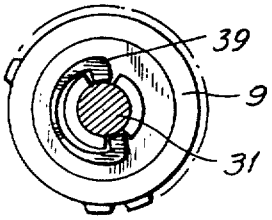

Reference is now made to FIG. 7, wherein a miniaturized printer, utilizing a shutter arrangement of the type detailed above, in a miniaturized printer wherein the shaft supporting each of the character rings is rotated two revolutions in each print cycle, is depicted, like reference numerals being utilized to denote like elements depicted above. Additionally, as illustrated in FIG. 7b, the spring 39 is disposed in friction engagement with the shaft 31, instead of riding in a notch in the manner illustrated in FIG. 4b, so that rotational force of the shaft 31 is directed to the character rings 9 by the frictional engagement of the spring 39 with the shaft 31. By rotating the shaft in the same direction through two revolutions during each print cycle, the spring 39 can be formed from a simple plate spring and, additionally, the coil spring 10 can be eliminated. Also, a shutter element 51 is required to prevent the return signal from being produced during the interval that the last character selection signal $T_{12}$ is produced and the occurrence of the stand-by signal S produced by the wide opening slit 36-S.

Rotation of the shaft 31, through two revolutions in each print cycle, is effected by defining a one-to-two (1:2) gear ratio between the intermittent driving gear 7 and intermittent driven gear 8. By this relationship, intermittent driving gear 7 is rotated through one revolution for each print cycle in order to effect two revolutions of intermittent driven gear 8 in each print cycle. The intermittent driving gear 7 is supported on a shaft 56, which shaft also supports shutter element 51, and permits the rotation of the shutter element to be synchronized with respect to the revolution of the character rings and thereby prevent the return signals from being produced in a manner to be discussed in greater detail below. It is noted that the printer, illustrated in FIG. 7a, is depicted in a stand-by position.

In operation, when the print cycle begins, the shutter element 51 is disposed out of alignment with the photo diode 33 and photo detector 34 at the beginning of a print cycle. Specifically, in response to the rotation of the intermittent driven gear 8, the detection plate 35 is rotated in the direction indicated by the arrow A, and the shutter element 51 is rotated in the opposite rotational direction, indicated by the arrow B. The slit openings 36, formed in the detection plate 35, thereby produce character selection timing signals representative of the position of each of the print characters formed on each character ring 9, to thereby effect positioning of the character rings by the pawls 37 in the same manner discussed in detail above. Once each of the print rings has been positioned, the print roller 14 sandwiches the web of paper 15 between same and the print character and a ribbon to thereby effect a printing operation.

It is noted that during the printing operation, the intermittent driving gear 7 continues to rotate. However, the recessed portion thereof clears the intermittent driven gear 8, and hence prevents rotation of the shaft 31 supporting each of the character rings. The shutter element is, therefore, rotated during this period and, hence, by the time the printing operation is completed, the shutter element 51 is disposed in optical alignment between the light emitting element 33 and the photo detector 34, to thereby prevent the stand-by signal S from being produced thereby. Accordingly, from the time that the leading surface 51a of the shutter element is disposed in optical alignment with the photo detector 34, no character selection timing signals or return pulses are produced by the positioning of the detector plate. During this interval, the intermittent driving gear effects a further rotation of the intermittent driven gear through a second revolution, with shutter element 51 preventing further character selection timing signals from being produced as the detection plate is rotated through a further revolution. The shutter element 51 is constructed and arranged, and the rotation of the shutter element synchronized, so that the trailing surface 51b clears optical alignment with the photo detector 34 after all of the narrow opening slits 36 pass the optical path of the photo detector 34 during the second revolution, to thereby assure that the first pulse produced at the end of the second revolution is a stand-by pulse S produced by the wider opening slit 36-S. Accordingly, stand-by pulse S signals the end of the printing cycle and the readiness of the printer to perform a further printing cycle once the occurrence of the signal S is detected.

The instant invention is particularly directed to preventing any character selection timing signals or return signals from being produced during the interval between which the last character selection timing signal is produced and a signal, representative of the end of the print cycle, namely, the stand-by signal S, is produced. Specifically, a shutter element can be utilized to prevent signals from being produced during this interval, thereby eliminating electronic circuitry that was heretofore needed in order to prevent the next print cycle from being inadvertently commenced before the preceding print cycle had been completed. These benefits simplify the construction of the miniaturized printer, reduce the price of same, and render same a more reliable and improved printer.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. In a printer including a plurality of print rings having print characters circumferentially disposed therearound, said print characters being selectively positioned in a print position by rotation of each of said print rings in a first rotational direction from a stand-by position to a print position during a print cycle and rotational drive means including motor means adapted, in response to being energized, to rotatably drive said print rings at least from said stand-by position to a print position during each print cycle, the improvement comprising a detection means for detecting the rotary position of said print rings and for generating a character selection timing pulse for each of the available rotational positions of each said print ring during each print cycle, said rotational positions of each of said print rings corresponding to a print character circumferentially disposed about said print rings, print selection means associated with each of said print rings for selectively positioning each of said print rings at respective predetermined print positions during each print cycle, in response to said character selection timing pulses produced by said detection means being applied thereto, said detection means being constructed and arranged to produce a stand-by signal representative of each print ring being returned to a stand-by position at the end of each print cycle, said detection means further including shutter means for preventing said detection means from producing said stand-by signal until a first predetermined interval of time after the last of said character selection timing pulses is generated in each print cycle.

2. The printer as claimed in claim 1, wherein said character selection timing signal is a pulse signal, said detection means including control circuit means adapted to measure a second predetermined time interval greater than the time interval between each of said character selection timing pulses in said character selection time signal and in response to detecting said second predetermined time interval and receiving said stand-by signal after said first predetermined time interval, being adapted to apply a deenergizing signal to said motor means to effect a braking of same.

3. The printer as claimed in claim 2, wherein said detection means is mechanically coupled to said print rings and is adapted to produce said character selection timing signals in response to said print rings being rotated from a stand-by position to a print position, said control circuit means including letter counter means for detecting each pulse of said character selection timing signal to thereby effect synchronization between the rotary position of said print rings and the pulses of said character selection timing signals produced by said detection means.

4. The printer as claimed in claim 2, wherein said detection means includes a detection plate having a first plurality of equally sized openings formed at predetermined distances with respect to each other, and a further opening that is wider than said first plurality of openings, and photo detection means for producing pulses of said character selection timing signals in response to said first plurality of openings being detected thereby, and for producing said stand-by signal in response to said wider opening being detected thereby.

5. The printer as claimed in claim 4, wherein said wider opening is representative of a stand-by position, said shutter means being adapted to be displaced out of optical alignment with said photo detection means and said openings in said detection plate, to thereby permit said stand-by reference timing signal to be detected by said photo detection means when said wider opening is aligned with said photo detection means, said control circuit means in response to said stand-by signal being applied thereof, applying said deenergization signal to said motor to effect the braking of same.

6. The printer as claimed in claim 4, wherein said wider opening in said detection plate is positioned to be in alignment with said photo detection means after each of said print rings are selectively positioned in a print position.

7. The printer as claimed in claim 6, wherein said shutter means includes a shutter element adapted to be disposed in optical alignment between said detection plate and said photo detection means for said first predetermined interval of time after said last character selection timing pulse is produced, to thereby prevent said stand-by signal from being produced until said shutter element is displaced out of optical alignment with said photo detection means.

8. The printer as claimed in claim 7, wherein said detection plate and print rings are supported on the same shaft, and are adapted to be synchronously rotated in response thereto, so that each of said openings in said detection plate are synchronized with the positioning of said print rings.

9. The printer as claimed in claim 8, wherein said control circuit means includes a first time interval means for detecting a second predetermined interval of time after the last pulse of said character selection signal is applied, said interval of time being greater than the interval of time between any of the pulses of said character selection timing signal, and in response thereto, producing a control signal, and switching means for receiving said control signal and said stand-by signal, said switching means in response to said reference timing signal being received thereby following said control signal being received thereby, being adapted to apply a deenergization signal to said drive motor means.

10. The printer as claimed in claim 8, wherein said shutter element is rotatably positioned on the rotary shaft supporting said detection plate and said character rings, said detection plate including means for engaging said shutter element when said print rings are returned from a print position to a stand-by position, to thereby displace said shutter element into optical alignment with said photo detection means.

11. The printer as claimed in claim 10, wherein said shutter element is further adapted to be engaged by said projection extending from said detection plate and displaced out of optical alignment with said photo detection means when each of the print rings is returned to a stand-by position.

12. The printer as claimed in claim 8, and including driving means rotating the shaft supporting said detection plate and said print rings, said shutter element being coupled to said driving means and being rotated thereby, said driving means being adapted to rotate said shutter element into optical alignment with said photo detection means during said first predetermined interval that said print rings are returned from a print position to a stand-by position, to thereby prevent character selection pulses from being produced during said interval.

* * * * *